(12) United States Patent
Kursun

(10) Patent No.: US 11,269,975 B2
(45) Date of Patent: Mar. 8, 2022

(54) SYSTEM FOR AUTHENTICATING A USER USING AN APPLICATION SPECIFIC INTEGRATED CIRCUIT EMBEDDED WITHIN A USER DEVICE

(71) Applicant: Bank of America Corporation, Charlotte, NC (US)

(72) Inventor: Eren Kursun, New York City, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 335 days.

(21) Appl. No.: 16/676,655

(22) Filed: Nov. 7, 2019

(65) Prior Publication Data

US 2021/0141874 A1    May 13, 2021

(51) Int. Cl.
| | | |
|---|---|---|
| *G06F 21/12* | (2013.01) | |
| *G06F 21/31* | (2013.01) | |
| *G06F 21/44* | (2013.01) | |
| *G06F 21/62* | (2013.01) | |

(52) U.S. Cl.
CPC ............ *G06F 21/123* (2013.01); *G06F 21/31* (2013.01); *G06F 21/44* (2013.01); *G06F 21/629* (2013.01)

(58) Field of Classification Search
CPC ...... G06F 21/123; G06F 21/629; G06F 21/44; G06F 21/31
See application file for complete search history.

(56) References Cited

U.S. PATENT DOCUMENTS

| | | |
|---|---|---|
| 5,796,827 A | 8/1998 | Coppersmith et al. |
| 6,477,117 B1 | 11/2002 | Narayanaswami et al. |
| 6,525,997 B1 | 2/2003 | Narayanaswami et al. |
| 6,556,222 B1 | 4/2003 | Narayanaswami |
| 6,720,860 B1 | 4/2004 | Narayanaswami |
| 7,081,905 B1 | 7/2006 | Raghunath |
| 7,203,524 B2 | 4/2007 | Tushinsky et al. |
| 7,203,665 B2 | 4/2007 | Donner |
| 7,356,706 B2 | 4/2008 | Scheurich |
| 2002/0021622 A1 | 2/2002 | Baroche |
| 2002/0160768 A1 | 10/2002 | Gventer |
| 2003/0151982 A1 | 8/2003 | Brewer et al. |
| 2004/0159700 A1 | 8/2004 | Khan et al. |
| 2005/0109841 A1 | 5/2005 | Ryan et al. |
| 2006/0208066 A1 | 9/2006 | Finn et al. |
| 2006/0288233 A1 | 12/2006 | Kozlay |

(Continued)

*Primary Examiner* — Nelson S. Giddins
(74) *Attorney, Agent, or Firm* — Moore & Van Allen PLLC; Anup Shrinivasan Iyer

(57) ABSTRACT

Systems, computer program products, and methods are described herein for authenticating a user using an application specific integrated circuit embedded within a user device. The present invention is configured to receive an indication that a user has initiated an application on the user device; determine that the application is associated with the application specific integrated circuit embedded within the user device; activate the application specific integrated circuit based on at least determining that the application is associated with the application specific integrated circuit; receive an indication that the user has initiated an execution of an action, via the application, with an entity; and execute the action using the application specific integrated circuit based on at least receiving the indication that the user has initiated the execution of the action.

17 Claims, 5 Drawing Sheets

(56) References Cited

U.S. PATENT DOCUMENTS

| | | | |
|---|---|---|---|
| 2007/0028118 A1* | 2/2007 | Brown | G06Q 20/4012 |
| | | | 713/185 |
| 2007/0043594 A1 | 2/2007 | Lavergne | |
| 2007/0080931 A1 | 4/2007 | Chen et al. | |
| 2007/0080933 A1 | 4/2007 | Chen et al. | |
| 2007/0087790 A1 | 4/2007 | Worick et al. | |
| 2007/0109208 A1 | 5/2007 | Turner | |
| 2007/0146218 A1 | 6/2007 | Turner et al. | |
| 2007/0294746 A1 | 12/2007 | Sasakura et al. | |
| 2008/0040951 A1 | 2/2008 | Kates | |
| 2008/0201576 A1 | 8/2008 | Kitagawa et al. | |
| 2008/0293453 A1 | 11/2008 | Atlas et al. | |
| 2011/0185183 A1* | 7/2011 | Yamamoto | H04L 63/0823 |
| | | | 713/182 |
| 2013/0207783 A1* | 8/2013 | Cruzado | G06F 21/86 |
| | | | 340/10.5 |
| 2021/0019061 A1* | 1/2021 | Hiltgen | G06F 3/0673 |

* cited by examiner

SYSTEM FOR AUTHENTICATING A USER USING AN APPLICATION SPECIFIC INTEGRATED CIRCUIT EMBEDDED WITHIN A USER DEVICE

FIELD OF THE INVENTION

The present invention embraces a system for authenticating a user using an application specific integrated circuit embedded within a user device.

BACKGROUND

Multi-factor authentication is a security system that requires more than one method of authentication from independent categories of credentials to verify the user's identity for a login or other transaction. The goal is to create a layered defense and make it more difficult for an unauthorized person to access a target such as a physical location, computing device, network, or database. One of the layered defenses include critical information associated with each user, such as a social security number, a driver's license number, date of birth, or the like. One of the challenges facing entities is to prevent unauthorized persons from gaining the critical information about the user. In addition to gaining unauthorized access to the critical information, unauthorized users also use customized software modules, such as malware, configured to cause issues to a computer, server, client, or network.

The advent of the internet and online banking permanently changed the way consumers conduct their banking activities and interact with entities. With users' growing reliance on mobile devices, most entities have adopted mobile technology for customer engagement and to provide services by developing customer facing mobile applications capable of being executed on mobile devices. There is a need for a system to increase the overall security of mobile transaction services associated with entities that require stricter authentication standards reduce the exposure to unauthorized persons.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for authenticating a user using an application specific integrated circuit embedded within a user device is presented. The system comprising an application specific integrated circuit embedded in a user device, wherein the application specific integrated circuit comprises: at least one application specific non-transitory storage device; at least one application specific processing device; and at least one application specific communication device; at least one non-transitory storage device; and at least one processing device coupled to the at least one non-transitory storage device, wherein the at least one processing device is configured to: receive an indication that a user has initiated an application on the user device; determine that the application is associated with the application specific integrated circuit embedded within the user device; activate the application specific integrated circuit based on at least determining that the application is associated with the application specific integrated circuit; receive an indication that the user has initiated an execution of an action, via the application, with an entity; and execute the action using the application specific integrated circuit based on at least receiving the indication that the user has initiated the execution of the action.

In some embodiments, the at least one processing device is further configured to: receive the indication that the user has initiated the execution of the action via the application; and initiate, via the application specific integrated circuit, an authentication subroutine configured to authenticate the user, wherein authenticating the user comprises: initiating a request for one or more authentication credentials from the user; receiving, from the user, the one or more authentication credentials in response to the request; validating the one or more authentication credentials received from the user; and verify a user identity based on at least validating the one or more authentication credentials.

In some embodiments, at least one application specific communication device is configured to establish a communication link with a back-end processing system associated with the entity to receive reference data associated with the user to be stored on the at least one application specific non-transitory storage device, wherein the reference data is used to validate the one or more authentication credentials received from the user.

In some embodiments, the one or more authentication credentials comprises at least an authentication chip, wherein the authentication chip comprises an identity verification chip and a personal authorization chip, wherein the identity verification chip and the personal authorization chip comprises at least one or more digital certificates.

In some embodiments, the processing device is further configured to: receive the authentication chip via a chip card receiver operatively coupled to the user device, wherein the chip card receiver is configured to communicate directly and only with the application specific integrated circuit.

In some embodiments, the processing device is further configured to: initiate, via the user device, a request for to receive a primary authentication credential from the user in response to receiving the authentication chip; and receive, via the user device, the primary authentication credential from the user.

In some embodiments, the processing device is further configured to: determine an authentication level required to execute the action; determine that the primary authentication credential does not satisfy the authentication level required to execute the action; initiate, via the user device, a request to receive a secondary authentication credential.

In some embodiments, the processing device is further configured to: receive, from the authentication chip, the secondary authentication credential, wherein the second authentication credential comprises a pseudo-random number generated using a pseudo-random number generator associated with the authentication chip.

In some embodiments, the at least one processing device is further configured to: receive, via the authentication chip, the pseudo-random number generated using the pseudo-random number generator stored on the authentication chip; compare the pseudo-random number with the reference data to determine a match; and verify the user identity based on at least determining the match.

In some embodiments, the at least one processing device is further configured to: determine an authentication level required to execute the action; determine one or more functionalities of one or more embedded devices associated with the user device, wherein the one or more functionalities of the one or more embedded devices present an opportunity for exposure in the execution of the action; and restrict the one or more functionalities of the one or more embedded devices associated with the user device.

In some embodiments, restricting the one or more functionalities of the one or more embedded devices associated with the user device comprises deactivating at least a portion of the one or more embedded devices, wherein deactivating further comprises deactivating one or more non-essential functionalities of the one or more embedded devices, wherein the one or more non-essential functionalities do not affect an operation of the user device.

In some embodiments, deactivating further comprises deactivating one or more essential functionalities of the one or more embedded devices, wherein the one or more essential functionalities are used in an operation of the user device.

In some embodiments, the at least one processing device is further configured to initiate control, using the application specific integrated circuit, of one or more operations of the user device previously performed by the one or more essential functionalities of the one or more embedded devices in response to deactivating the one or more essential functionalities of the one or more embedded devices.

In some embodiments, the at least one processing device is further configured to: determine one or more encryption protocols based on at least determining the authentication level required to execute the action; receive, from the user, information to execute the action; and encrypt, using the application specific integrated circuit, the information received from the user using at least one of the one or more encryption protocols.

In some embodiments, the at least one processing device is further configured to program the application specific integrated circuit, wherein programming further comprises determining one or more applications to be associated with the application specific integrated circuit, wherein associating further comprises processing an execution of one or more actions initiated via the one or more determined applications using the application specific integrated circuit.

In another aspect, a computer implemented method for authenticating a user using an application specific integrated circuit embedded within a user device is presented. The method comprising: receiving an indication that a user has initiated an application on a user device; determining that the application is associated with and application specific integrated circuit embedded within the user device; activating the application specific integrated circuit based on at least determining that the application is associated with the application specific integrated circuit; receiving an indication that the user has initiated an execution of an action, via the application, with an entity; and executing the action using the application specific integrated circuit based on at least receiving the indication that the user has initiated the execution of the action.

In yet another aspect, a computer program product for authenticating a user using an application specific integrated circuit embedded within a user device is presented. The computer program product comprising a non-transitory computer-readable medium comprising code causing a first apparatus to: receive an indication that a user has initiated an application on a user device; determine that the application is associated with an application specific integrated circuit embedded within the user device; activate the application specific integrated circuit based on at least determining that the application is associated with the application specific integrated circuit; receive an indication that the user has initiated an execution of an action, via the application, with an entity; and execute the action using the application specific integrated circuit based on at least receiving the indication that the user has initiated the execution of the action.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
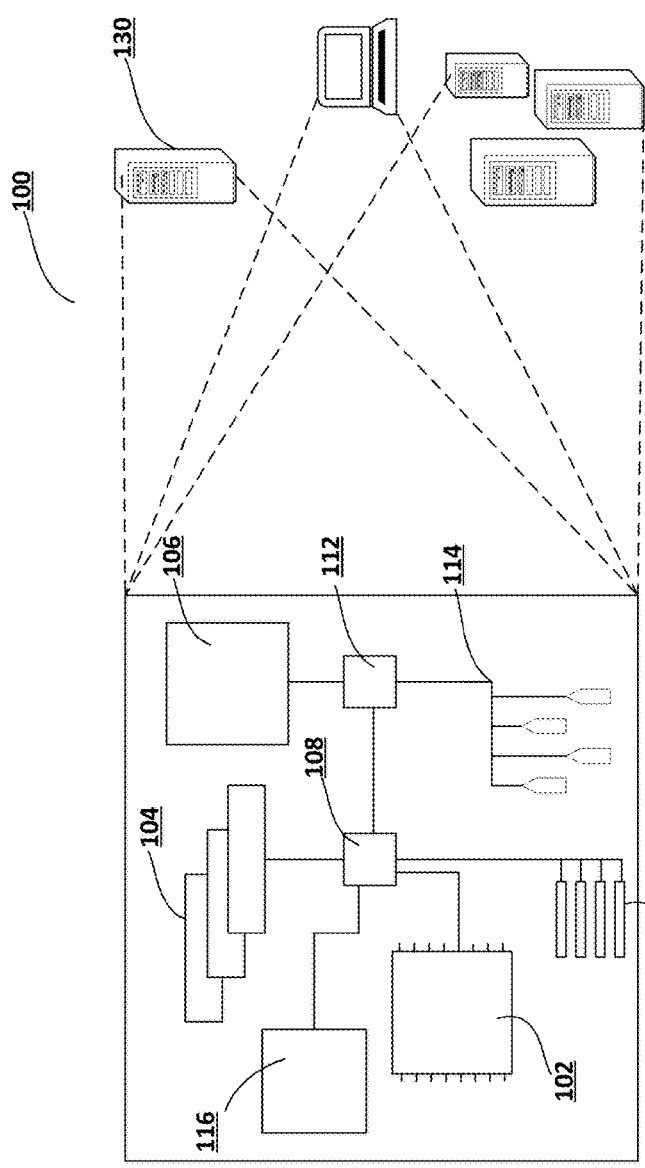
Figure 1:
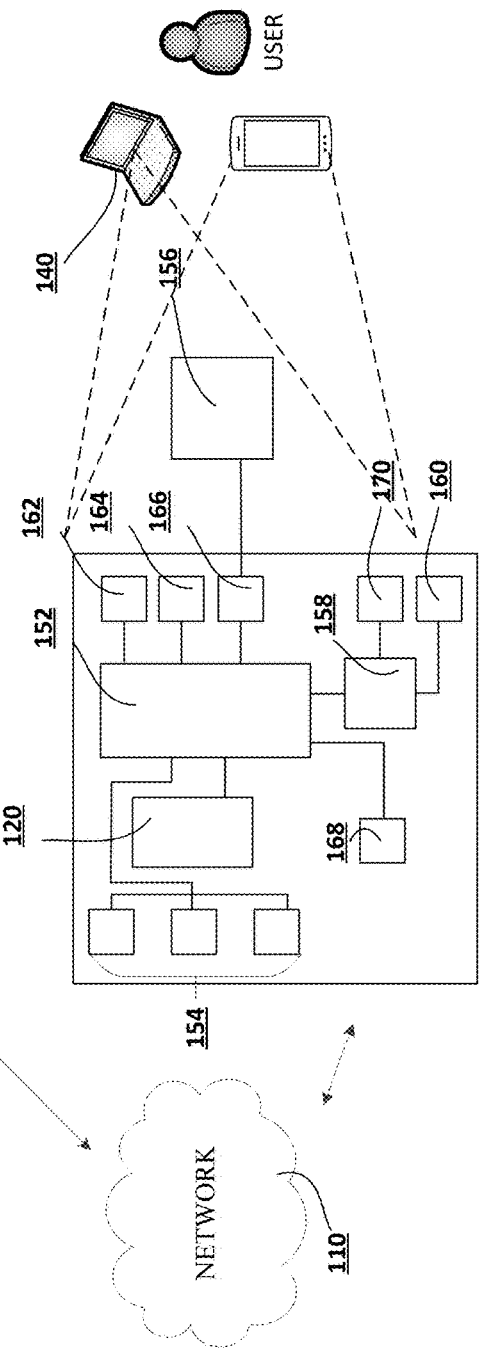
Figure 2:
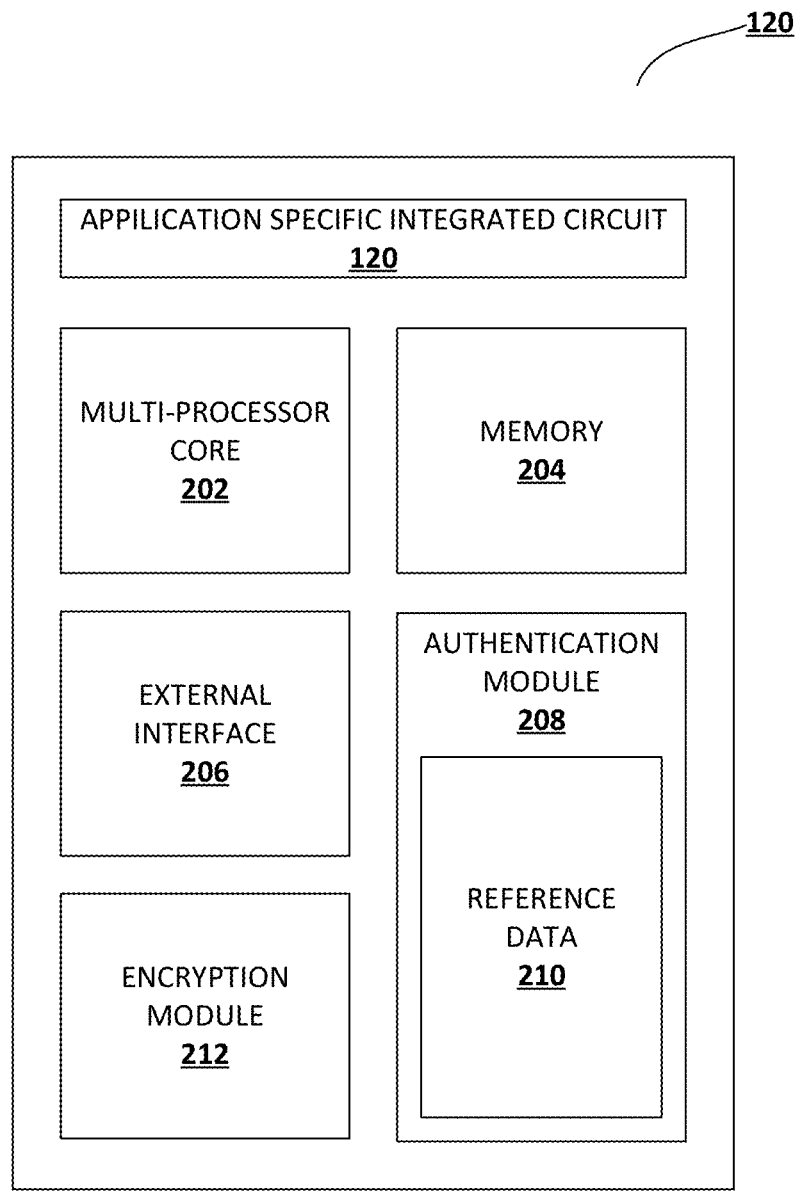
Figure 3:
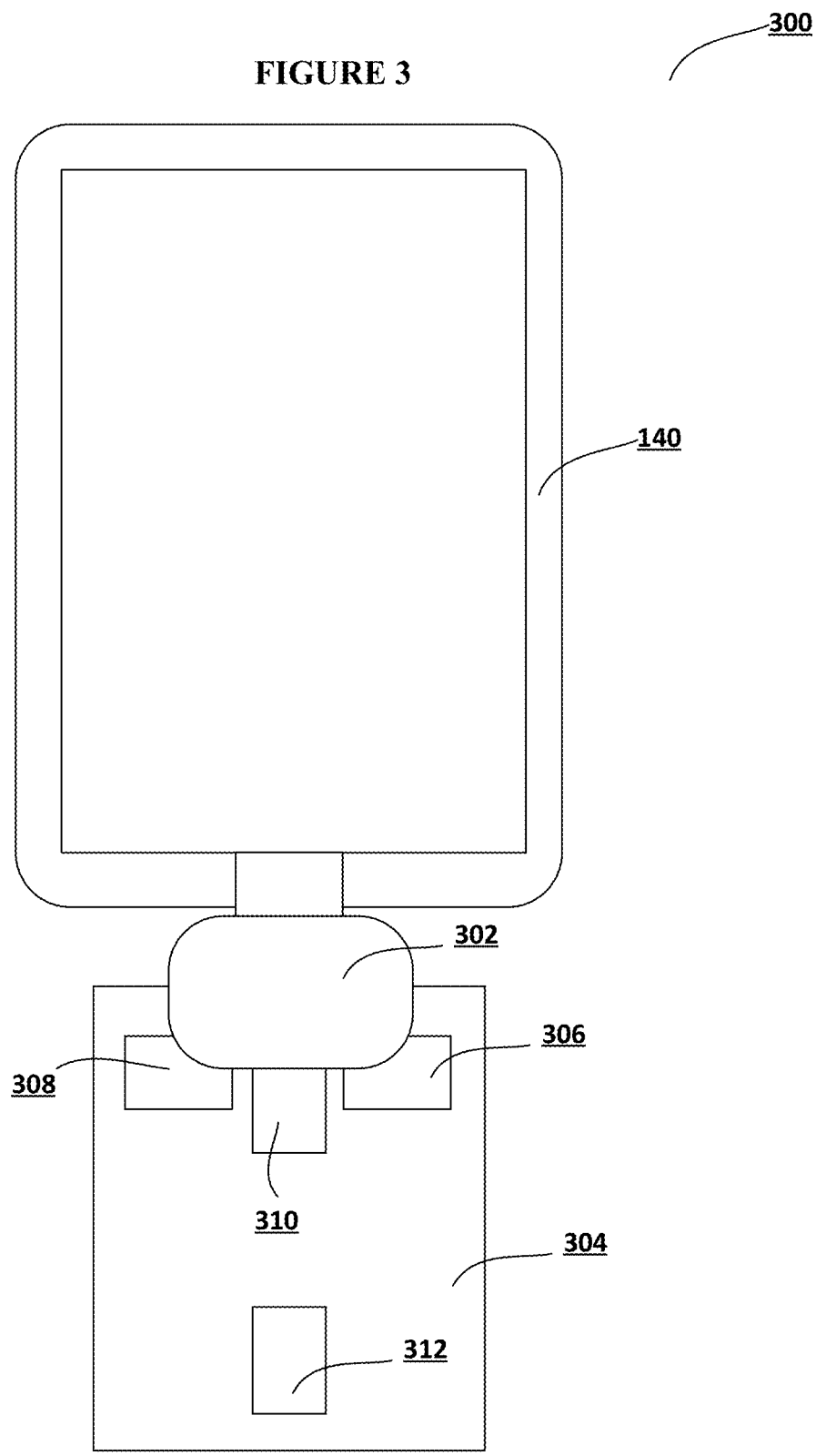
Figure 4:
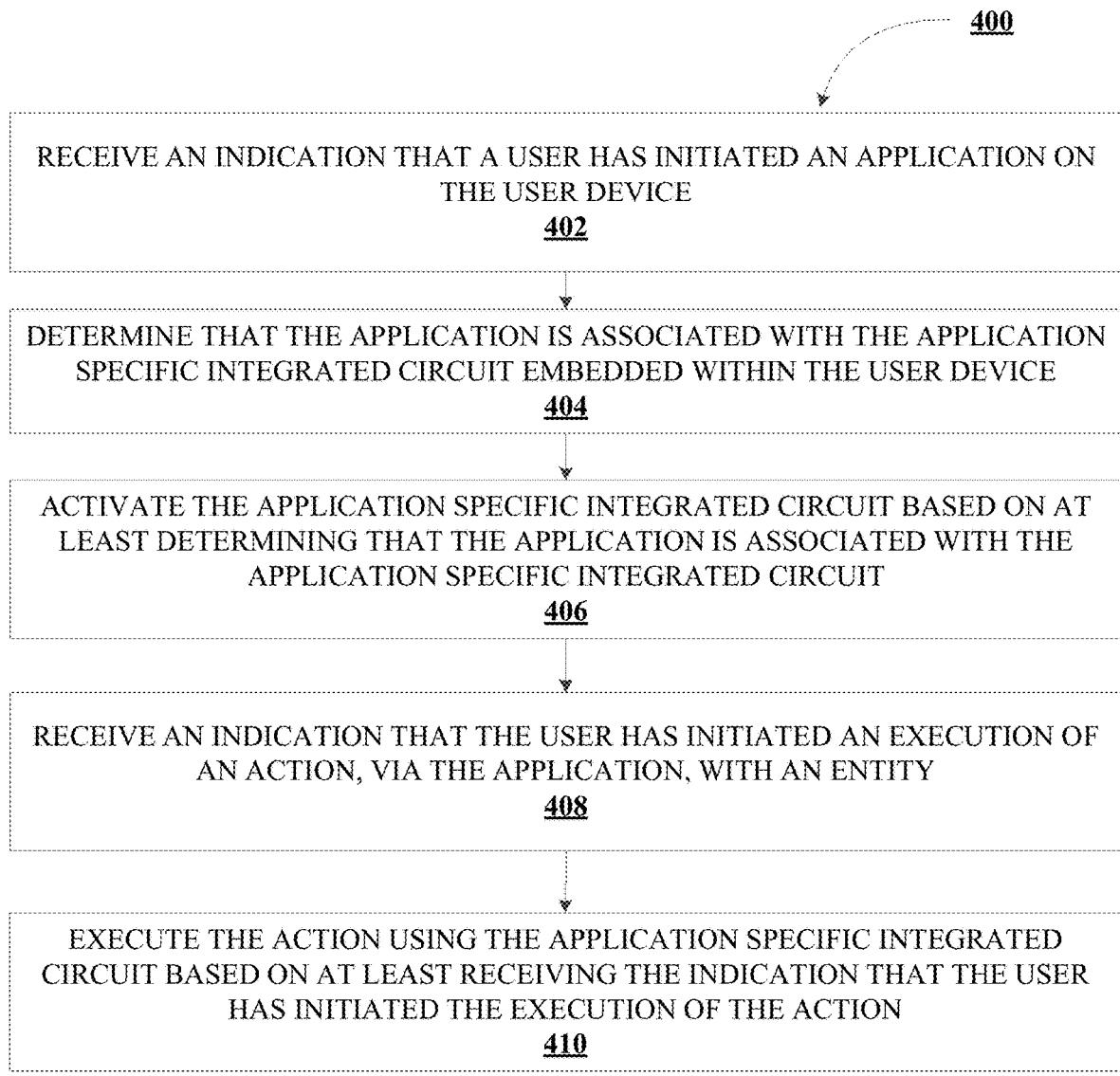
Figure 5:
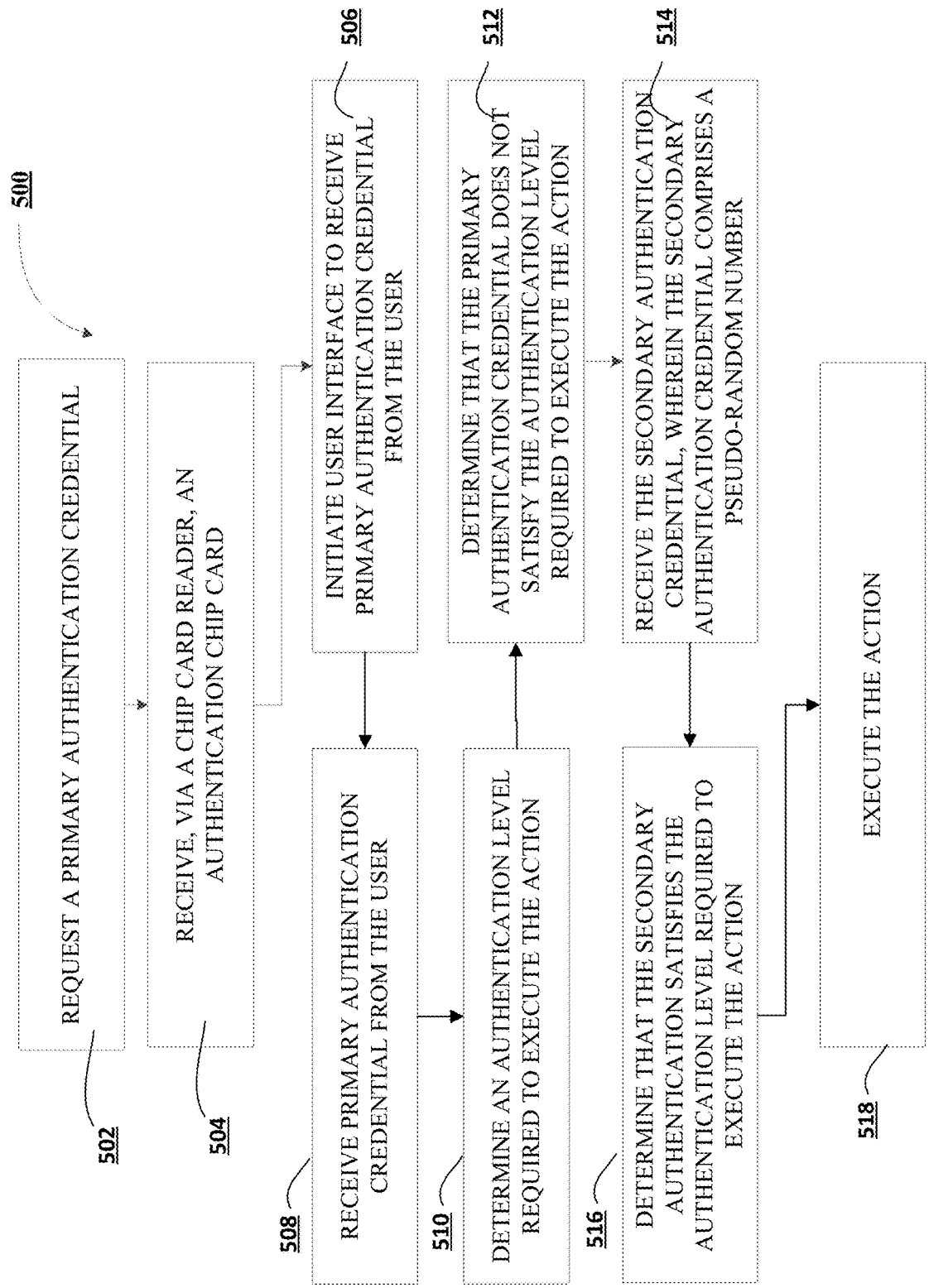

Having thus described embodiments of the invention in general terms, reference will now be made the accompanying drawings, wherein:

FIG. 1 illustrates technical components of a system for authenticating a user using an application specific integrated circuit embedded within a user device, in accordance with an embodiment of the invention;

FIG. 2 illustrates a component structure of the application specific integrated circuit, in accordance with an embodiment of the invention;

FIG. 3 illustrates using a chip card reader to receive an authentication chip to authenticate the user to execute an action, in accordance to an embodiment of the invention;

FIG. 4 illustrates a process flow for authenticating a user using an application specific integrated circuit embedded within a user device, in accordance with an embodiment of the invention; and FIG. 5 illustrates a process flow for authenticating a user to execute the action, in accordance with an embodiment of an invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credential" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication credential may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication credential or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

FIG. 1 presents an exemplary block diagram of the system environment for authenticating a user using an application specific integrated circuit embedded within a user device 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 120, 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

The user input system 140, in accordance with an embodiment of the invention, includes an application specific integrated circuit 120. The application specific integrated circuit 120 is an integrated circuit customized for a particular use, rather than intended for general-purpose use. The application specific integrated circuit 120 may be manufactured by one or more third party semi-conductor manufacturers in collaboration with one or more entities, such as financial institutions. The semi-conductor manufacturers and the one or more entities may previously agree on one or more specific applications to be associated with the application specific integrated circuit 120, such that any actions initiated via the predetermined applications may be processed by the application specific integrated circuit 120. To that end, the application specific integrated circuit 120 may be configured to isolate itself from the embedded modules within the user input system 140 to process any transactions initiated via any one of the predetermined applications. As shown in FIG. 1, the application specific integrated circuit 120 may be configured to be operably connected to the processor 152. In some embodiments, the application specific integrated circuit 120 may be configured to remain dormant during regular operation of the user input system 140. When the processor 152 detects that a predetermined application has been initiated by the user using the user input system 140, the processor 152 may be configured to transmit a control signal configured to activate the application specific integrated circuit 120.

Various implementations of the systems and techniques described here can be realized in digital electronic circuitry, integrated circuitry, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The advent of the internet and online banking permanently changed the way consumers conduct their banking activities and interact with entities. This evolution was further impelled by the seemingly immediate and widespread adoption of mobile devices. With users' growing reliance on mobile devices, most entities have adopted mobile technology for customer engagement and to provide services by developing customer facing mobile applications capable of being executed on mobile devices. Due to the sensitive nature of the services provided by financial institutions, these entities rely on strict authentication standards when providing access to financial services via mobile devices. However, these mobile applications still have to use software and hardware components of the mobile device when communicating with a back-end system of the financial institution systems. Furthermore, all applications installed on the mobile device use the same software and hardware components of the mobile device as those used by the mobile applications associated with the financial institutions to execute actions. Even though the authentication standards associated with the mobile applications associated with the financial institution are stricter than other mobile applications stored on the mobile device, exposures that affect the mobile applications with less strict authentication standards also affect software and hardware components that are common to all mobile applications.

The present invention provides the functional benefit of using an application specific integrated circuit that is capable of processing sensitive actions in an environment isolated from the user device and configured to process actions from specific applications stored on the user device. To this end, the present invention includes the use of a dedicated application specific integrated circuit that is designed by integrated chip manufacturing companies in association with one or more entities to execute actions initiated via specific applications stored on the user device. The dedicated application specific integrated circuit may be configured to execute actions initiated via specific applications stored on the user device by isolating itself from the rest of the user device containing the application specific integrated circuit. For example, the dedicated application specific integrated circuit may be configured to execute one or more financial services applications such as mobile wallets, banking applications, payment applications, investment applications, authentication applications or other security applications to run in a completely different segregated stack, and corresponding operating systems as well as potentially segregated communication with special protocols. To this end, the present invention establishes trusted communication protocol between the application specific integrated circuit and back-end system of the financial institution, where each application specific integrated circuit is programmed to be used with a single user (not multiple users). In doing so, a large number of unauthorized activity and exposure issues may be eliminated.

FIG. 2 illustrates a component structure of the application specific integrated circuit 120, in accordance with an embodiment of the invention. As shown in FIG. 2, the application specific integrated circuit 120 is a system-on-chip (SoC). An SoC integrates all components of a computer or other electronic systems, including, but not limited to, a central processing unit, input/output ports, memories, on-chip caches, wireless networking capabilities and often digital camera hardware and firmware, all on a single substrate or microchip. It may contain digital, analog, mixed-signal, and radio frequency signal processing functions, depending on the applications configured to be executed using the application specific integrated circuit 120.

In some embodiments, the application specific integrated circuit 120 includes a multi-processor core 202, such as a microcontroller, microprocessor, digital signal processor, or application-specific instruction set processor core. Each multi-processor core 202 is customized for an application domain and designed to be more efficient than general-purpose instructions for a specific type of workload. In one aspect, the application specific integrated circuit 120 may be configured to use a reduced instruction set computer (RISC), whose instruction set architecture allows for fewer cycles per instruction than a complex instruction set computer (CISC). The multi-processor core 202 configured to execute instructions within the application specific integrated circuit 120, including instructions stored in the memory 204. Memory technologies for an SoC based application specific integrated circuit 120 includes read-only memory (ROM), random-access memory (RAM), electrically erasable programmable ROM (EEPROM) and flash memory. As in other computer systems, RAM can be subdivided into relatively faster static RAM (SRAM) and the slower dynamic RAM (DRAM). Depending on the cache hierarchy implemented by the application specific integrated circuit 120, SRAM and DRAM may be used to implement process registers, L1 caches, and lower levels of the cache hierarchy.

In some embodiments, the application specific integrated circuit 120 includes an external interface 206 for communication protocols to communicate with the system 130. These external interfaces are often based on industry standards such as USB, FireWire, Ethernet, Universal Synchronous/Asynchronous Receiver/Transmitter (USART), Serial Peripheral Interface (SPI), High-Definition Multimedia Interface (HDMI), Inter-Integrated Circuit (I²C), or the like. The use of these interfaces may vary based on the intended application. In addition, wireless networking protocols such as Wi-Fi, Bluetooth, IPv6 Low Power Wireless Personal Area Network (6LoWPAN), and near field communication may also be supported. In some other embodiments, the application specific integrated circuit 120 may communicate with the system 130 (and one or more other devices) wirelessly through communication interface 158.

In some embodiments, the application specific integrated circuit 120 may audibly communicate using the audio codec 162, which may generate audible sound for a user, such as through a speaker, e.g., in a handset of user input system 140, and may communicate with the user through control interface 164 and display interface 166 coupled to a display 156.

As shown in FIG. 2, the application specific integrated circuit 120 may include an authentication module 208 configured to authenticate access using secure cryptographic protocols that require the systems that are party to a transaction or a session to prove their identities using cryptographic techniques. In some embodiments, the authentication module 208 includes reference data 210 that includes previously verified authentication credentials, such as digital certificates, biometric information, and other user reference data. During authentication, authentication credentials provided by the user are compared to those in the reference data. If the credentials match, and the authenticated entity is authorized, it is granted access. In some embodiments, the application specific integrated circuit 120 includes an encryption module 212 configured to perform encryption/decryption securely within a physical or logical boundary, using a hardware, software or hybrid engine located within the boundary.

In some embodiments, the application specific integrated circuit 120 includes a network based communications subsystem that implements a router-based packet switching network between individual modules within the application specific integrated circuit 120. The network based communication subsystem may apply theory and methods of computer networking to on-chip communications, thus bringing notable improvements over conventional bus and crossbar communication architectures and improving scalability of systems-on-chip.

FIG. 3 illustrates using a chip card reader to receive an authentication chip to authenticate the user to execute an action 300, in accordance to an embodiment of the invention. As shown in FIG. 3, the chip card reader 302 may be a mobile point-of-sale (POS) system that can be used anywhere and function independently of elaborate transaction services provided by an entity. In some embodiments, the chip card reader 302 serves as an electronic link between the user and an entity, via mobile applications stored on the user input system 140 to facilitate the transfer of data between the user and the entity. To this end, the chip card reader 302 may be operably connected to the user input system 140. In some embodiments, the chip card reader 302 may be configured to be physically connected to the user input system 140 via one or more external ports. In some other embodiments, the chip card reader 302 may be configured to be wirelessly connected to the user input system 140 via one or more wireless networking protocols such as Wi-Fi, Bluetooth, IPv6 Low Power Wireless Personal Area Network (6LoWPAN), and/or any other near field communication technologies. To facilitate the transfer of data between the user and the entity, each user is provided with a proprietary payment card 304 by the entity to initiate the transfer of data. As shown in FIG. 3, the payment card includes a payment chip 312, pseudo-random number generator chip 308, personal authorization chip 310, and an identity verification chip 306.

As shown in FIG. 3, the payment chip 312 may be an embedded microchip capable of storing data and designed to enable secure payment via compatible chip card readers such as the chip card reader 302. Each time the user wishes to execute an action, the payment chip 304 may be inserted or swiped into the chip card reader 302. The chip card reader 302 may include circuitry to extract information from the payment chip 312.

As used herein, "authentication chip" may refer collectively to the identity verification chip 306, the personal authorization chip 310, and the pseudo-random number generator chip 308. The identity verification chip 306 may be an embedded microchip configured to store one or more authentication information specific to the user such as a username, a password, a personal identification number (PIN), a passcode, an answer to a security question, and/or the like. In some embodiments, the authentication information may be previously confirmed and assigned to the user when the user initially signs up for the payment card 304 with the financial institution. When the user wishes to execute a transaction that requires authentication credentials, the user may insert the payment card 304 into the card reader 302. In response, the system may be configured to initiate a user interface on the user device requesting at least one of the one or more authentication information. Once the authentication information is received, the system may be configured to compare the received authentication information with the authentication information stored on the identity verification chip 306 to determine a match. In some embodiments, the received authentication information may be compared to the authentication information stored in the reference data 210 of the application specific integrated circuit 120 to determine a match.

The personal authorization chip 310 may be an embedded microchip configured to store one or more personal attributes associated with the user, such as biometric information (e.g., voice authentication, a fingerprint, facial features, a retina scan, and/or the like). In some embodiments, the biometric information may be previously confirmed and stored on the personal authorization chip 310 when the user initially signs up for the payment card 304. Similar to the identity verification chip 306, when the user wishes to execute a transaction that requires authentication credentials, the user may insert the payment card 304 into the card reader 302. In response, the system may be configured to initiate a user interface on the user device to receive the biometric information. In some embodiments, the user device may be operatively connected to one or more devices capable of receiving and processing the received biometric information. In response to receiving the biometric information, the system may be configured to compare the received biometric information with the biometric information stored on the personal authorization chip 310 to determine a match. In some embodiments, the received biometric information may be compared to the biometric information stored in the reference data 210 of the application specific integrated circuit 120 to determine a match.

The pseudo-random number generator chip 308 may be a deterministic random bit generator that may be a token—either hardware token or a software token. In some embodiments, when the user wishes to execute a transaction that requires authentication credentials, the user may insert the payment card 304 into the card reader 302. In response, the system may be configured to read the pseudo-random number generator chip 308. In one aspect, the pseudo-random number generator chip 308 may be processed by another application stored on the user device, which requires a separate set of authentication credentials to be accessed. Once authenticated, the application may be configured to generate a code. This code may then be appended to a personal PIN/passcode and used by the user for authentication purposes. In some embodiments, the pseudo-random number generator may be compared to the reference data 210 of the application specific integrated circuit 120 to determine a match.

FIG. 4 illustrates a process flow for authenticating a user using an application specific integrated circuit 120 embedded within a user device 400, in accordance with an embodiment of the invention. As shown in block 402, the process flow includes receiving an indication that a user has initiated an application on the user device. As used herein, an "application" is an individual software unit, accessible via a user device, configured to execute a specific set of functions based on user input. Next, the process flow includes determining that the application is associated with the application specific integrated circuit 120 embedded within the user device, as shown in block 404. In some embodiments, the system may be configured to associate one or more specific applications with the application specific integrated circuit 120. In doing so, any action initiated via the one or more specific applications are re-routed to be processed using the multi-processor core 202 of the application specific integrated circuit 120 instead of one or more processing devices associated with the user input system 140.

As shown in block 406, the process flow includes activating the application specific integrated circuit 120 based on at least determining that the application is associated with the application specific integrated circuit 120. In some embodiments, the system may be configured to associate the one or more specific applications with the application specific integrated circuit 120 at a time the application specific integrated circuit 120 was designed, fabricated, and programmed. In one aspect, associating the one or more specific applications with the application specific integrated circuit 120 includes processing an execution of one or more actions initiated via the one or more specific applications using the application specific integrated circuit 120. As described herein, the application specific integrated circuit 120 is typically designed by device manufacturing companies in association with one or more entities with increased authentication requirements to execute an action. In one example, the entity may be a financial institution having a higher authentication requirement than most other applications stored on the user input system 140 to execute any action initiated via one or more application associated with the financial institution.

In some other embodiments, the system may be configured to enable the user to associate the one or more specific applications with the application specific integrated circuit 120 at any time. In this regard, the system may be configured to first authenticate the user. In some embodiments, each user may be associated with an authentication level. Depending on the authentication level of the user, the system may be configured to enable the user to select one or more applications to be associated with the application specific integrated circuit 120. A user with higher authentication level may be able to select applications that require stricter authentication and/or applications that have a higher exposure level. A user with a lower authentication level may be able to select applications that require less strict authentication and/or applications that have a lower exposure level compared to applications that require stricter authentication and/or applications that have a higher exposure level.

As shown in block 408, the process flow includes receiving an indication that the user has initiated an execution of an action via the application, with an entity. As discussed herein, the entity may be a financial institution or any other entity with mobile applications that requires stricter authorization. In some embodiments, the system may be configured to continuously monitor the user device usage by the user. In doing so, the system may be configured to determine whether the user has initiated an application associated with the application specific integrated circuit 120 and/or whether the user has initiated an action to be executed via the application associated with the application specific integrated circuit 120.

In some embodiments, an action may refer to a request, ability, and/or opportunity to view, access and use objects, products, goods, commodities, services, and/or the like. Some example implementations herein contemplate property held by a user, including property that is stored and/or maintained by a third party entity. In some example implementations, an action may refer to the request, ability, and/or opportunity to view, access, and use one or more accounts or property that is associated with a specific account. In one aspect accounts may be accounts that have cash or cash equivalents, commodities, and/or accounts that are funded with or contain property, such as safety deposit boxes containing jewelry, art or other valuables, a trust account that is funded with property, or the like. In some example implementations, an action may refer to an agreement, communication or movement carried out between the user and the entity. In another example implementation, an action may refer to an electronic exchange or transfer of money from one account to another.

As shown in block 410, the process flow includes executing the action using the application specific integrated circuit 120 based on at least receiving the indication that the user has initiated the execution of the action. As described herein, the application specific integrated circuit 120 remains dormant during regular use of the user device until an application associated with the application specific integrated circuit 120 is detected. Once detected, the system may be configured to transmit a control signal to the application specific integrated circuit 120 to activate it. In some embodiments, activating the application specific integrated circuit 120 includes initiating a power-on sequence which is programmed to apply power to each module on the application specific integrated circuit 120 with different power supplies. Having activated the application specific integrated circuit 120, the system may be configured to execute the action using the application specific integrated circuit 120, by isolating the application specific integrated circuit 120 from the rest of the user device. In this way, the action may be executed completely independent of the user device software and hardware capable of becoming compromised by other applications with less strict authentication requirements. In this way, sensitive actions may be executed with a reduced likelihood of exposure to unauthorized access.

FIG. 5 illustrates a process flow for authenticating a user to execute the action 500, in accordance with an embodiment of an invention. As shown in block 502, the process flow includes requesting a primary authentication credential. In some embodiments, the system may be configured to receive the indication that the user has initiated the execution of the action via an application that is associated with the application specific integrated circuit 120. In response, the system may be configured to initiate, via the application specific integrated circuit 120, an authentication subroutine configured to authenticate the user. The authentication subroutine may be configured to initiate a request for a primary authentication credential from the user. To validate the authentication credentials and verify the identity of the user, a communication device associated with the application specific integrated circuit 120 may be configured to establish a communication link with a back-end processing system associated with the entity to receive reference data associated with the user to be stored on a non-transitory storage device associated with the application specific integrated circuit 120.

Next, the process flow includes receiving, via a chip card reader 302, an authentication chip, as shown in block 504. In this regard, the chip card reader 302 may include a microcontroller chip that may be configured to read or write on to the authentication chip. In some embodiments, the authentication chip may be received when the user inserts the payment card into the chip card reader 302. In some other embodiments, the chip card reader 302 may use any near-field contactless communication technologies to receive the authentication chip. In one aspect, the chip card reader 302 is operatively coupled to the user device and is configured to communicate directly and only with the application specific integrated circuit 120. In response to receiving the authentication chip, the chip card reader 302 communicates the information read from the authentication chip to the user device.

Next, the process flow includes initiating a user interface to receive primary authentication credential from the user, as shown in block 506. In some embodiments, the system may be configured to initiate the user interface for display on the user device in response to the communication received by the user device from the chip card reader 302. As described herein. the user interface may include means to receive the primary authentication credential from the user in the form of a radio buttons, text fields, oral inputs, drop down menus, check boxes, text entry fields, clickable or interactive features, or the like.

Next, the process flow includes receiving primary authentication credential from the user, as shown in block 508. As described herein, the primary authentication credential may be any one of the authentication credentials described herein, such as, a username, a password, a personal identification number (PIN), a passcode, biometric information (e.g., voice authentication, a fingerprint, and/or a retina scan), an answer to a security question, a unique intrinsic user activity, such as making a predefined motion with a user device, or the like.

Next, the process flow includes determining an authentication level required to execute the action, as shown in block 510. A continuum of authentication may be used to quantify (or dictate) the levels of authentication. Similarly, a continuum of functions permitted may be used to quantify (or dictate) the number or context in which functions are permitted. For instance, the authentication continuum may range from "zero authentication," which requires no authentication credentials, to "hard authentication," which requires the strictest combination of credentials. In between the two extremes, "a soft authentication" requires minimal credentials, moderate credentials or most credentials for various points along the continuum. The continuum generally represents the number of credentials required, type of credentials, and/or the relative strength of the credentials required for that point on the continuum.

Next, the process flow includes determining that the primary authentication credential does not satisfy the authentication level required to execute the action, as shown in block 512. In one aspect, the continuum of authentication may be coupled with application actions permitted. As described herein, actions may typically refer to what a user is permitted to "see" and/or what the user is permitted to "do". More specifically, this may refer to whether a specific action is permitted at a certain point on the continuum and/or the context in which a certain action is permitted. For instance, the actions permitted may range from "no actions are permitted" to "all actions are permitted." In between the extremes, minimal actions are permitted, moderate actions are permitted and most actions are permitted. Thus, any given point along the continuum corresponds with a certain amount and/or number of actions that are permitted and/or the context in which certain actions are permitted. That said, the system may be configured to determine that the primary authentication credential does not satisfy the authentication level required to execute the action. In response, the system may be configured to require additional authentication credentials in addition to the primary authentication credential to be able to execute the action.

Next, the process flow includes receiving the secondary authentication credential, wherein the secondary authentication credential comprises a pseudo-random number, as shown in block 514. In some embodiments, the pseudo-random number may be received from the pseudo-random number generator chip embedded on the payment card. Once received, the system may be configured to compare the pseudo-random number with the reference data to determine a match. In response, the system may be configured to verify the user identity based on at least determining the match.

Next, the process flow includes determining that the secondary authentication satisfies the authentication level required to execute the action, as shown in block 516. In some embodiments, depending on the authentication level required to execute the action, the system may be configured to determine one or more functionalities of the one or more embedded (or non-embedded) devices associated with the user device. In one aspect, the one or more functionalities of the one or more embedded devices may present an opportunity for exposure in the execution of the action. In response, the system may be configured to restrict the one or more functionalities of the one or more embedded devices associated with the user device. In some embodiments, restricting the one or more functionalities of the one or more embedded devices associated with the user device includes temporarily deactivating at least a portion of the one or more embedded devices. In one aspect, deactivating at least a portion of the one or more embedded devices includes deactivating one or more non-essential functionalities of the one or more embedded devices. In one aspect, the one or more non-essential functionalities do not affect an operation of the user device. In another aspect, the one or more essential functionalities are used in the operation of the user device. In doing so, the system may be configured to initiate control, using the application specific integrated circuit 120, of one or more operations of the user device previously performed by the one or more essential functionalities of the one or more embedded devices in response to deactivating the one or more essential functionalities of the one or more embedded devices.

Lastly, the process flow includes executing the action, as shown in block 518. In response to determining that the primary authentication credential and the second authentication credential satisfies the authentication level required to execute the action, the system may be configured to execute the action. In some embodiments, the system may be configured to determine one or more encryption protocols based on at least determining the authentication level required to execute the action. In response, the system may encrypt using the application specific integrated circuit 120 any information received from the user to execute the action using at least one of the one or more encryption protocols.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for authenticating a user using an application specific integrated circuit embedded within a user device, the system comprising:

an application specific integrated circuit embedded in a user device, wherein the application specific integrated circuit comprises:
at least one application specific non-transitory storage device;
at least one application specific processing device; and
at least one application specific communication device;
at least one non-transitory storage device; and
at least one processing device coupled to the at least one non-transitory storage device, wherein the at least one processing device is configured to:

receive an indication that a user has initiated an application on the user device;
determine that the application is associated with the application specific integrated circuit embedded within the user device;
activate the application specific integrated circuit based on at least determining that the application is associated with the application specific integrated circuit;
receive an indication that the user has initiated an execution of an action, via the application, with an entity;
execute the action using the application specific integrated circuit based on at least receiving the indication that the user has initiated the execution of the action;
receive the indication that the user has initiated the execution of the action via the application;
receive, using an authentication subroutine configured to authenticate the user, one or more authentication credentials, wherein the one or more authentication credentials comprises at least an authentication chip;
receive, via the user device, the primary authentication credential from the user in response to receiving the authentication chip;
determine that the primary authentication credential does not satisfy an authentication level required to execute the action;
receive, via the authentication chip, a secondary authentication credential, wherein the second authentication credential comprises a pseudo-random number generated using the pseudo-random number generator stored on the authentication chip;
compare the pseudo-random number with the reference data to determine a match; and
verify the user identity based on at least determining the match.

2. The system of claim 1, wherein the at least one processing device is further configured to:
initiate, via the application specific integrated circuit, the authentication subroutine configured to authenticate the user, wherein authenticating the user comprises:
initiating a request for the one or more authentication credentials from the user;
receiving, from the user, the one or more authentication credentials in response to the request;
validating the one or more authentication credentials received from the user; and
verify a user identity based on at least validating the one or more authentication credentials.

3. The system of claim 2, wherein at least one application specific communication device is configured to establish a communication link with a back-end processing system associated with the entity to receive reference data associated with the user to be stored on the at least one application specific non-transitory storage device, wherein the reference data is used to validate the one or more authentication credentials received from the user.

4. The system of claim 3, wherein the authentication chip comprises an identity verification chip and a personal authorization chip, wherein the identity verification chip and the personal authorization chip comprises at least one or more digital certificates.

5. The system of claim 4, wherein the processing device is further configured to:
receive the authentication chip via a chip card receiver operatively coupled to the user device, wherein the chip card receiver is configured to communicate directly and only with the application specific integrated circuit.

6. The system of claim 2, wherein the at least one processing device is further configured to:
determine an authentication level required to execute the action;
determine one or more functionalities of one or more embedded devices associated with the user device, wherein the one or more functionalities of the one or more embedded devices present an opportunity for exposure in the execution of the action; and
restrict the one or more functionalities of the one or more embedded devices associated with the user device.

7. The system of claim 6, wherein restricting the one or more functionalities of the one or more embedded devices associated with the user device comprises deactivating at least a portion of the one or more embedded devices, wherein deactivating further comprises deactivating one or more non-essential functionalities of the one or more embedded devices, wherein the one or more non-essential functionalities do not affect an operation of the user device.

8. The system of claim 6, wherein deactivating further comprises deactivating one or more essential functionalities of the one or more embedded devices, wherein the one or more essential functionalities are used in an operation of the user device.

9. The system of claim 8, wherein the at least one processing device is further configured to initiate control, using the application specific integrated circuit, of one or more operations of the user device previously performed by the one or more essential functionalities of the one or more embedded devices in response to deactivating the one or more essential functionalities of the one or more embedded devices.

10. The system of claim 6, wherein the at least one processing device is further configured to:
determine one or more encryption protocols based on at least determining the authentication level required to execute the action;
receive, from the user, information to execute the action; and
encrypt, using the application specific integrated circuit, the information received from the user using at least one of the one or more encryption protocols.

11. The system of claim 1, wherein the processing device is further configured to:
determine the authentication level required to execute the action;
determine that the primary authentication credential does not satisfy the authentication level required to execute the action; and
initiate, via the user device, a request to receive a secondary authentication credential.

12. The system of claim 1, wherein the at least one processing device is further configured to program the application specific integrated circuit, wherein programming further comprises determining one or more applications to be associated with the application specific integrated circuit, wherein associating further comprises processing an execution of one or more actions initiated via the one or more determined applications using the application specific integrated circuit.

13. A computer implemented method for authenticating a user using an application specific integrated circuit embedded within a user device, the method comprising:
receiving an indication that a user has initiated an application on a user device;

determining that the application is associated with and application specific integrated circuit embedded within the user device;

activating the application specific integrated circuit based on at least determining that the application is associated with the application specific integrated circuit;

receiving an indication that the user has initiated an execution of an action, via the application, with an entity;

executing the action using the application specific integrated circuit based on at least receiving the indication that the user has initiated the execution of the action;

receiving the indication that the user has initiated the execution of the action via the application;

receiving, using an authentication subroutine configured to authenticate the user, one or more authentication credentials, wherein the one or more authentication credentials comprises at least an authentication chip;

receiving, via the user device, the primary authentication credential from the user in response to receiving the authentication chip;

determining that the primary authentication credential does not satisfy an authentication level required to execute the action;

receiving, via the authentication chip, a secondary authentication credential, wherein the second authentication credential comprises a pseudo-random number generated using the pseudo-random number generator stored on the authentication chip;

comparing the pseudo-random number with the reference data to determine a match; and verifying the user identity based on at least determining the match.

14. The method of claim 13, wherein the method further comprises:

initiating, via the application specific integrated circuit, the authentication subroutine configured to authenticate the user, wherein authenticating the user comprises:

initiating a request for one or more authentication credentials from the user;

receiving, from the user, the one or more authentication credentials in response to the request;

validating the one or more authentication credentials received from the user; and verify a user identity based on at least validating the one or more authentication credentials.

15. The method of claim 14, wherein at least one application specific communication device is configured to establish a communication link with a back-end processing system associated with the entity to receive reference data associated with the user to be stored on at least one application specific non-transitory storage device, wherein the reference data is used to validate the one or more authentication credentials received from the user.

16. The method of claim 15, wherein the authentication chip comprises an identity verification chip and a personal authorization chip, wherein the identity verification chip and the personal authorization chip comprises at least one or more digital certificates.

17. A computer program product for authenticating a user using an application specific integrated circuit embedded within a user device, the computer program product comprising a non-transitory computer-readable medium comprising code causing a first apparatus to:

receive an indication that a user has initiated an application on a user device;

determine that the application is associated with an application specific integrated circuit embedded within the user device;

activate the application specific integrated circuit based on at least determining that the application is associated with the application specific integrated circuit;

receive an indication that the user has initiated an execution of an action, via the application, with an entity;

execute the action using the application specific integrated circuit based on at least receiving the indication that the user has initiated the execution of the action;

receive the indication that the user has initiated the execution of the action via the application;

receive, using an authentication subroutine configured to authenticate the user, one or more authentication credentials, wherein the one or more authentication credentials comprises at least an authentication chip;

receive, via the user device, the primary authentication credential from the user in response to receiving the authentication chip;

determine that the primary authentication credential does not satisfy an authentication level required to execute the action;

receive, via the authentication chip, a secondary authentication credential, wherein the second authentication credential comprises a pseudo-random number generated using the pseudo-random number generator stored on the authentication chip;

compare the pseudo-random number with the reference data to determine a match; and verify the user identity based on at least determining the match.

* * * * *